United States Patent
Eriksson

(10) Patent No.: US 8,751,669 B2
(45) Date of Patent: Jun. 10, 2014

(54) METHOD AND ARRANGEMENT TO MAINTAIN A TCP CONNECTION

(75) Inventor: Anders Eriksson, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 432 days.

(21) Appl. No.: 12/808,555

(22) PCT Filed: Dec. 20, 2007

(86) PCT No.: PCT/SE2007/051053
§ 371 (c)(1),
(2), (4) Date: Jun. 16, 2010

(87) PCT Pub. No.: WO2009/082296
PCT Pub. Date: Jul. 2, 2009

(65) Prior Publication Data
US 2011/0131308 A1    Jun. 2, 2011

(51) Int. Cl.
*G06F 15/16* (2006.01)

(52) U.S. Cl.
USPC ............ 709/228; 709/220; 709/222; 709/227

(58) Field of Classification Search
CPC ................................................. H04L 29/08612
USPC .................................. 709/220, 222, 227, 228
See application file for complete search history.

(56) References Cited

U.S. PATENT DOCUMENTS

| 7,313,623 | B2 * | 12/2007 | Elzur et al. | 709/227 |
| 7,684,346 | B2 * | 3/2010 | Valli | 370/252 |
| 7,715,334 | B2 * | 5/2010 | Harsch | 370/311 |

FOREIGN PATENT DOCUMENTS

| EP | 1569404 A1 | 8/2005 |
| WO | WO 2008081075 A1 | 7/2008 |

OTHER PUBLICATIONS

Carstens, J. "A method for offloading keep-alive hello". IPCOMOOOI47260D; Mar. 16, 2007.

* cited by examiner

*Primary Examiner* — Phuoc Nguyen

(57) ABSTRACT

The present invention relates to a method and an arrangement to maintain a TCP connection (230) between two hosts (140, 250) in a multi-hop network (110,120). If the connection (230) is inactive (no IP packets sent or received) during a certain period of time, it may happen that the connection (230) is released by certain intermediate network entities such as a Network Address Translation NAT function (130). The current invention overcomes this problem by sending keep-alive packets (210) from one of the hosts (250) towards the other (140) at regular intervals. Said packets (210) prevent the NAT (130) from releasing the connection (230). In order to not disturb the other host (140) e.g. a mobile terminal in a sleeping mode, the keep-alive packets (210) are adapted in such way that they are sent far enough to reach the NAT (130) but not all way to the other host (140).

20 Claims, 14 Drawing Sheets

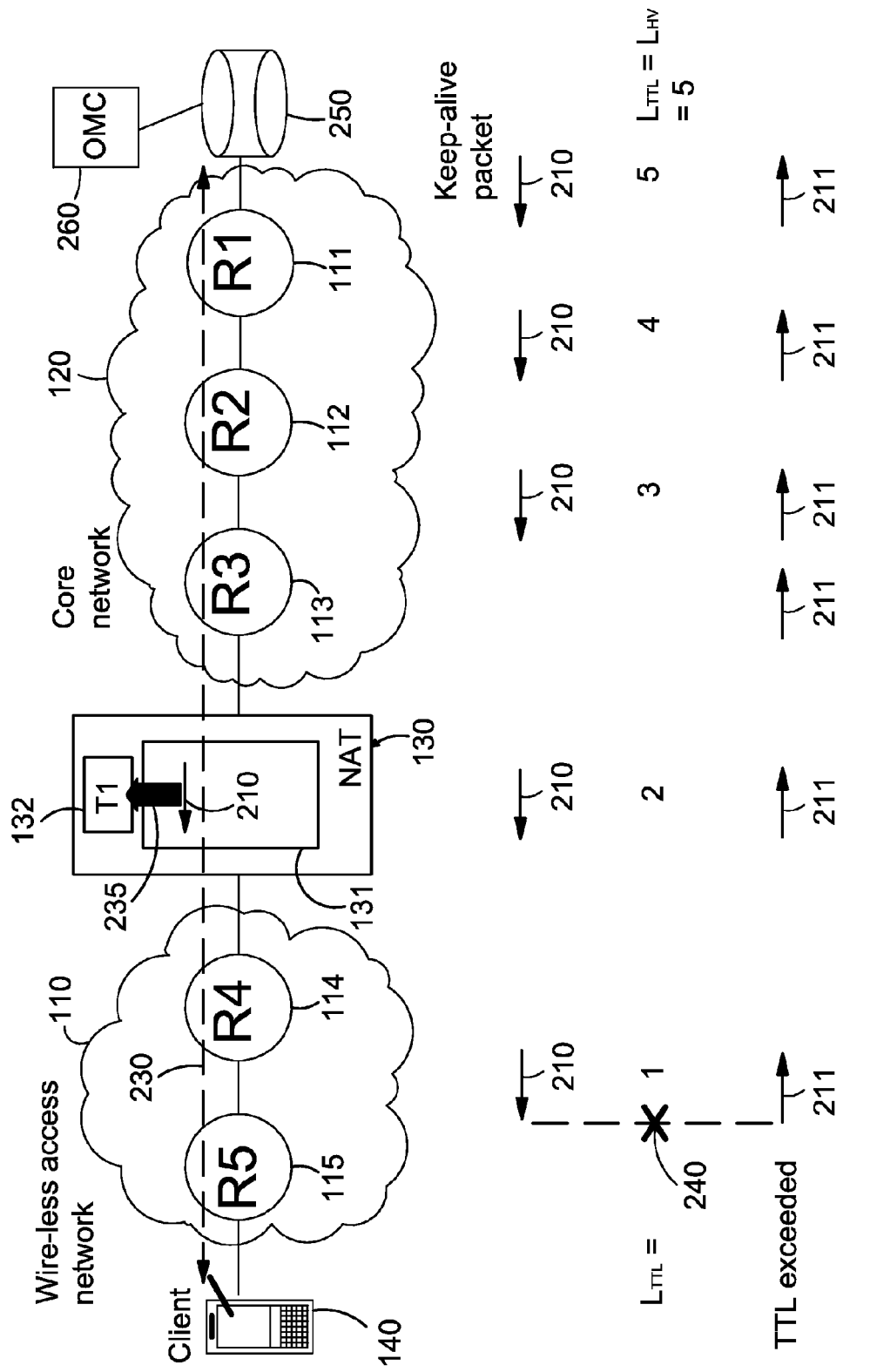

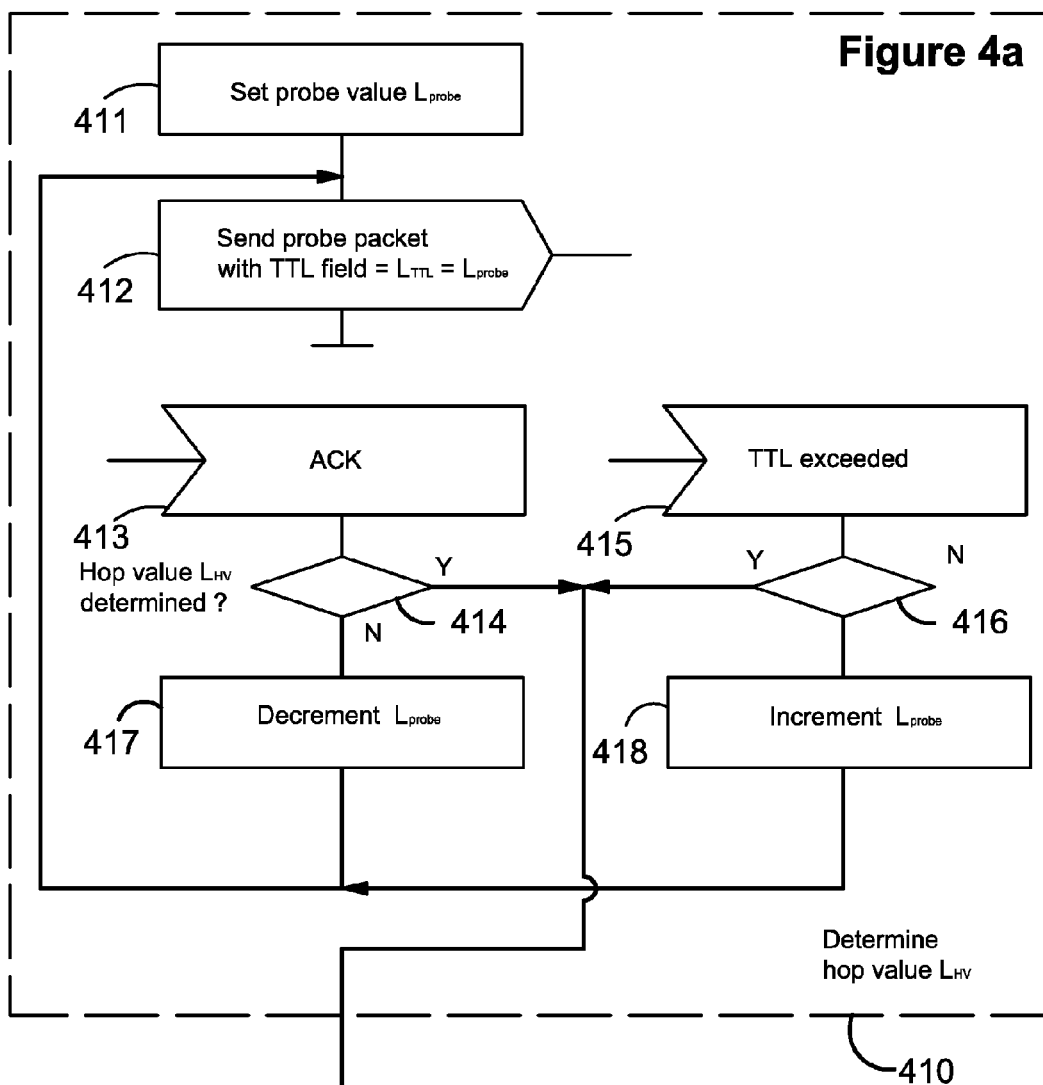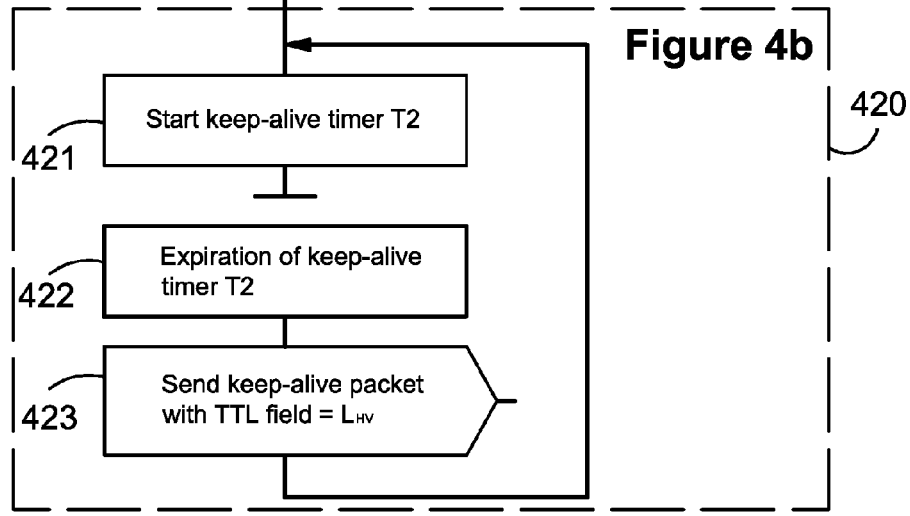

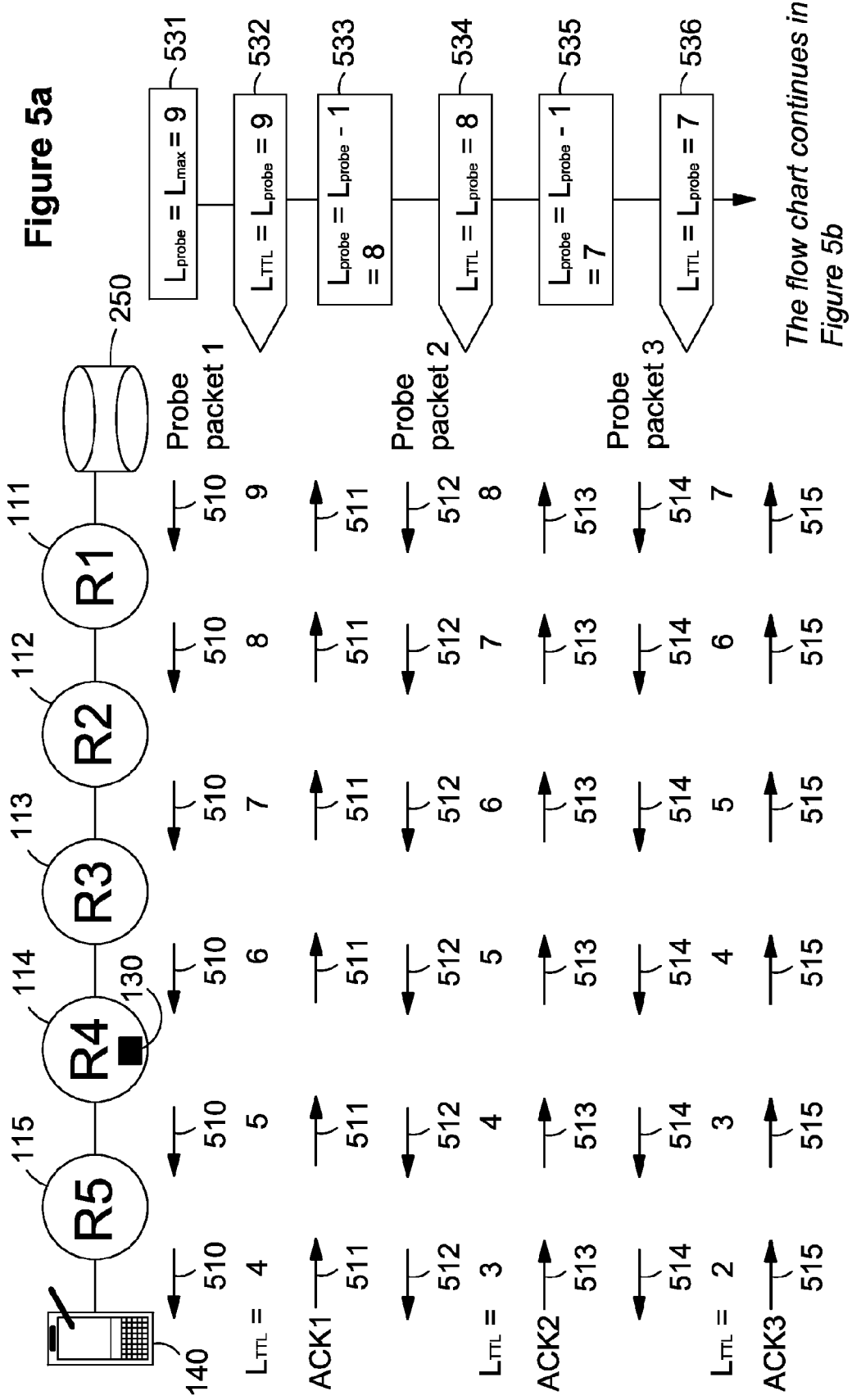

METHOD AND ARRANGEMENT TO MAINTAIN A TCP CONNECTION

TECHNICAL FIELD OF THE INVENTION

The present invention relates to a method and an arrangement to maintain a TCP connection in a multi-hop network.

DESCRIPTION OF RELATED ART

In an IP based communication network (below also referred to as a multi-hop network), the TCP protocol plays a fundamental role for establishing reliable connections between computer hosts. A TCP connection is designed to be maintained between two hosts in the multi-hop network for an arbitrary period of time and as long as the hosts are operational. It is not necessary that the TCP connection carries any traffic. With the growth of access networks (such as private or home networks) an additional entity has been introduced in the network, the NAT or NAPT (Network Address (Port) Translation) functionality. The NAT functionality is often implemented in a network access node (in home networks typically a wireless router) that serves the access network comprising a plurality of hosts (often terminals) connected to the access node. The access node is in turn connected to the core network (the Internet) through a network interface. Each host in the access network is allocated a unique private IP address. Normally, an Internet Service Provider (ISP) allocates only one public IP address per network interface. So, in order to allow more than one host in the access network to communicate towards the internet using only one public IP address, the Network Address Translation (NAT) functionality is necessary. The functionality of a NAT/NAPT is for example described in the Internet document RFC 3022.

The introduction of NATs has however an impact on the durability of established TCP connections. Is has become design practice that many NATs are implemented with TCP binding timers for each established connection. A TCP binding timer is basically a timer that expires when no packets on a certain TCP connection have passed the NAT for a certain period of time. When the timer expires, the TCP connection is released by the NAT and needs to be re-established again if any new data packets have to be sent. The reason why the NATs have these binding timers is due to physical limitations. A NAT can only keep a finite number of connections in its memory. A common policy is therefore to release old and inactive connections. Some NATs can have other implementations to solve these physical limitations. One is to have a finite priority list of established connections. As soon as a packet is sent on a certain connection, that connection is put on top of the priority list. When establishing a new connection through the NAT, the connection that was at the bottom of the priority list is released if there is no memory left to store bindings for the new connection.

This means that a TCP connection that is intended to be maintained between two hosts for a long time (for example a connection between a client and a presence server) simply is released by the NAT if no packets have been sent during a certain period of time.

One counter-measure to overcome this is to use short-lived TCP connections that are established only when one host need to communicate with the other. The intensity of sent packets on these connections is normally high enough to prevent the NAT from releasing the connection. This solution has however the drawback that it adds architectural complexity to the network. It requires for example out of band signalling protocols such as SS7 (Signalling System No 7) or similar.

A number of implementers use a mechanism of sending keep-alive packets to verify that the host in the other end is still reachable or to ensure that the connection is still open. An example on this is found in U.S. Pat. Nos. 6,212,175 and 7,088,698. These patents disclose a mobile communication unit that sends keep-alive packets to reset a keep-idle timer of a server.

SUMMARY OF THE INVENTION

It has been observed that by sending a keep-alive packet from one host to the other host (for example from a server to a client) the binding timer in the NAT is restarted. As a result, the release of the TCP connection is delayed and the connection is maintained through the NAT. The same effect applies for NATs that have alternative implementations to the binding timers.

A problem occurs however when the TCP connection is established between for example a server and a client located in a wire-less network. In wire-less networks the client is normally a mobile terminal (such as a mobile phone, a PDA etc.). These terminals do often have limited power resources consisting of batteries. A keep-alive packet that is sent from the server to a mobile terminal that is idle causes an undesirable 'wake up' of the terminal's transmission facilities (chipsets, antenna etc). These 'wakeups' cause considerable drain of the mobile terminal's battery.

The current invention comprises a method and an arrangement to overcome this problem. To maintain the connection in the multi-hop network a keep-alive packet is sent from a first host (e.g. the server) towards a second host (e.g. the mobile terminal). The keep-alive packet is designed to delay the release of the connection (e.g. by restarting the binding timer in the NAT) and to make enough hops to reach the network node where the NAT is implemented but not all the way to the second host. The method uses an inherent mechanism in the internet protocol called time-to-live TTL.

This mechanism is originally designed for detecting that IP packets are caught in an endless loop between routers in the multi-hop network. This is a situation that can occur if for example a routing table in a router has been misconfigured. The mechanism requires that an information field in the IP packet header called the time-to-live information field is set to a particular value, a time-to-live value. This value is decremented by each router at each hop the IP packet makes in the multi-hop network. The router that decrements the time-to-live value to zero, discards the IP packet and returns a TTL exceeded packet back towards the host that sent the IP packet. In the current invention the first host sets this time-to-live value to a specific value, a hop value that is less than the number of hops the keep-alive packet needs to make in order to reach the second host (e.g. the mobile terminal) but greater than or equal to the number of hops the packet needs to make in order to reach the network node with the NAT.

Applying the method to the example with the server and the mobile terminal, the server sends a keep-alive packet with a hop value set to for example to one less than the number of router hops needed to reach the mobile terminal. The keep-alive packet reaches far enough to restart the binding timer in the NAT but is discarded before it reaches the mobile terminal.

The hop value used in the keep-alive packet can be set by configuring the first host with a unique hop value for each connection. This can be done from an Operation and Maintenance Center OMC connected to the first host. The invention includes however an optional feature where the first host is designed to automatically determine the hop value. The first host is designed to send a set of probe packets towards the second host according to a certain algorithm. In one embodiment, the probe packets are carrying a time-to-live value information field in the IP header.

This field corresponds to the time-to-live value information field in the header of the keep-alive packet but is further on called the second time-to-live value information field. This second time-to-live value information field is set to an initial time-to-live value that equals a so called probe value. As for the keep-alive packets the time-to-live value in the second time-to-live value information field is decremented by one for each router the probe packet passes. If the time-to-live value reaches zero, the router discards the probe packet and sends back a time-to-live exceeded packet to the first host. When the first host receives the time-to-live exceeded packet, the probe value (i.e. the time-to-live value that was initially used when the probe packet was sent) is incremented (e.g. by one). If on the other hand the probe packet reaches the second host, the second host responds with an acknowledge packet. When the first host receives the acknowledge packet, the probe value is decremented (e.g. by one). The incremented or decremented probe value is used as the initial time-to-live value in a subsequent probe packet. By trying with different probe values in the probe packets, the first host can eventually determine the hop value. As a further option, the probe packet can be a regular payload carrying packet where the second time-to-live value information field is used in a same manner as described above.

The invention further comprises a first host (e.g. a server) comprising at least one processor device coupled to at least one transmitter device and at least one receiver device and where this first host is designed to maintain a connection with a second host according to the method described above. The first host can also have the optional feature to automatically determine the hop value by sending probe packets towards the second host. The transmitter device and the receiver device in the first host may be designed to respectively transmit and receive protocol data units according to the TCP protocol. The first host may also be designed to be connected to an Operation and Maintenance Center OMC.

One advantage with the current invention is that the keep-alive packet delays the release of the connection but does not disturb the second host. If the second host is a mobile terminal battery-draining 'wake-ups' are avoided. Another advantage is that the invention can be implemented in the TCP protocol stack in the first host. If the first host is a server this will completely alleviate the burden from each of the server's applications. Yet another advantage is that no design modifications to the second host, routers or the TCP protocol are necessary.

The objective with the current invention is therefore to provide a method and an apparatus to maintain a connection between a first and a second host in a multi-hop network without any unnecessary disturbance of the second host.

The invention will now be described in more detail and with preferred embodiments and referring to accompanying drawings.

BRIEF DESCRIPTION OF THE DRAWINGS

FIG. 2 is a block diagram illustrating the method and the arrangement according to the current invention.

FIG. 4a is a flow chart illustrating an automated method to determine the hop value.

FIG. 4b is a flow chart illustrating the method to maintain the connection according to the current invention.

FIGS. 5a and 5b are block diagrams and flow charts illustrating a first detailed embodiment of a method to determine the hop value in a multi-hop network.

DETAILED DESCRIPTION OF EMBODIMENTS

Figure 1A:
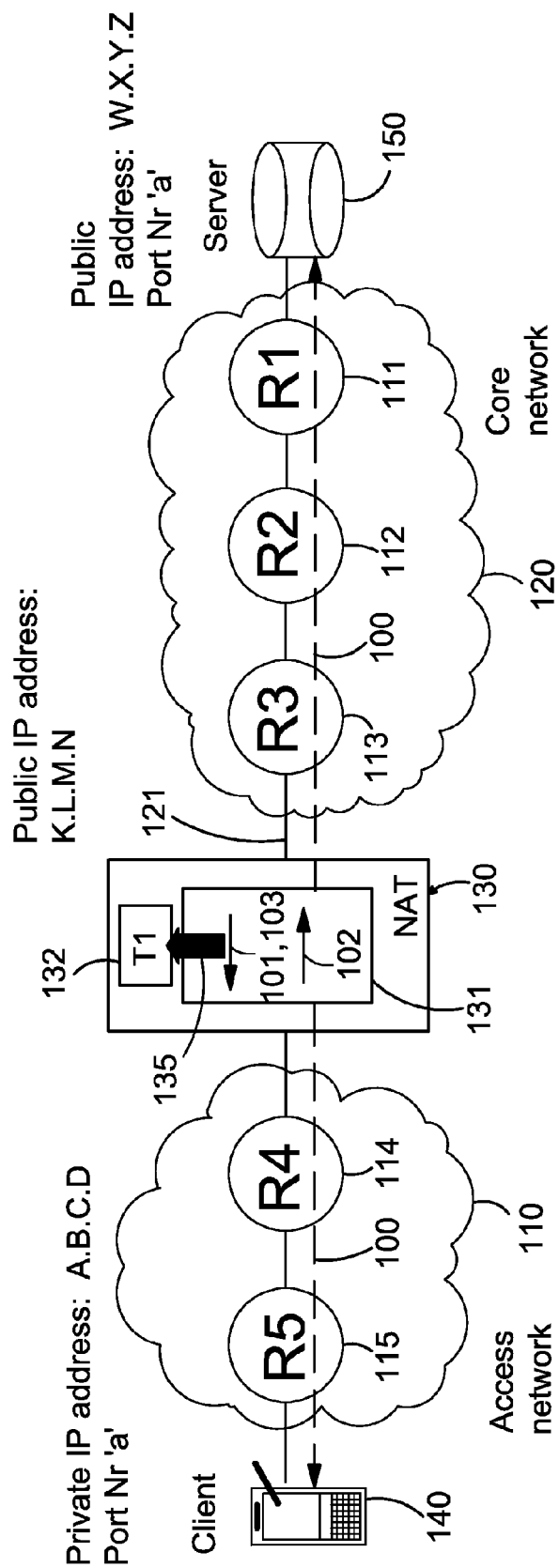
FIG. 1a is a block diagram illustrating a NAT located between an access network and a core network.

FIG. 1a illustrates an example of a known multi-hop communication network comprising an access network 110 and a core network 120 connected to each other over a network interface 121. A second host (a client 140) connected to the access network 110 has established a TCP connection 100 to a first host (a server 150) connected the core network 120. This connection 100 passes at least one network node comprising routers R5 115, R4 114 in the access network 110 and routers R3 113, R2 112 and R1 111 in the core network 120. The client 140 has been allocated a private IP address A.B.C.D and the server 150 has been allocated a public IP address W.X.Y.Z. Normally an Internet Service Provider ISP allocates only one public address K.L.M.N to the interface 121 between the access network 110 and the core network 120. So, in order to let a plurality of clients 140 in the access network 110 share the one public address K.L.M.N, a NAT 130 is included between the two networks 110, 120. The NAT functionality 130 is integrated in one of the network nodes as for example the access router R4 114, but for illustrative purposes the NAT 130 is shown in FIG. 1a as a separate entity. For each established connection 100, the NAT 130 has stored a binding. The binding comprises for each side of the NAT 130, a source IP address, a source port, a destination IP address and a destination port. This binding is stored in a binding table 131. As the NAT 130 can not store bindings for an infinite number of connections 100, it is design practise that the NAT 130 releases connections 100 that not have been active for a certain period of time. This inactivity can be determined in different ways as mentioned above. In FIG. 1 each established connection 100 is assigned a connection binding timer T1 132 in the NAT 130. If the binding timer T1 132 is running, it will be restarted in action 135 to its initial value $T_{bind}$ each time a packet 101, 102 passes the NAT 130. If no packet 101, 102 arrive, the binding timer T1 132 will eventually expire. At expiry, the bindings for the corresponding connection 100 are released by the NAT 130 and subsequent packets 101, 102 related to this connection 100 received from the server 150 or the client 140 respectively are ignored. This has a significant negative effect on services that require TCP connections that need to be established for a long time and have relatively long idle times, as for example a connection between a client and a presence server.

It has been observed that this problem can be overcome by sending so called TCP keep-alive packets 103 from the server 150 to the client 140. Keep-alive packets 103 are normally retransmitted packets that have a sequence number set to the highest sequence number already sent in the connection 100.

If keep-alive packets 103 are sent through the NAT 130 at time intervals that are shorter than the value $T_{bind}$ of the binding timer T1 132, the timer T1 132 is restarted and the connection 100 is maintained.

However, if the client 140 is a mobile terminal in a wireless access network 110, each received keep-alive packet 103 'wakes up' the mobile terminal 140 if it is in idle mode. These 'wake-ups' of the idle terminal 140 causes an unnecessary drain of the mobile terminal's battery. This problem is overcome by the current invention.

An embodiment of the invention is illustrated in FIG. 2. In this embodiment, the first host is a modified server 250 and the second host is a mobile terminal 140. Between the server 250 and the mobile terminal 140 a TCP connection 230 is established via the routers R1-R5 111-115. The server 250 can also be connected to an Operation and Maintenance center OMC 260.

The server 250 is designed to send keep-alive packets 210 towards the mobile terminal 140. As in FIG. 1a, the keep-alive packet 210 triggers in action 235 a restart of the binding timer T1 132 in the NAT 130. The difference between the keep-alive packet 103 in FIG. 1a and the keep-alive packet 210 in FIG. 2 is that the latter packet 210 is designed to reach far enough through the wire-less network 110 to restart the binding timer T1 132 in the NAT 130 but not as far as to reach the mobile terminal 140. To achieve this, an inherent mechanism from the IP protocol called time-to-live is used.

Figure 3:
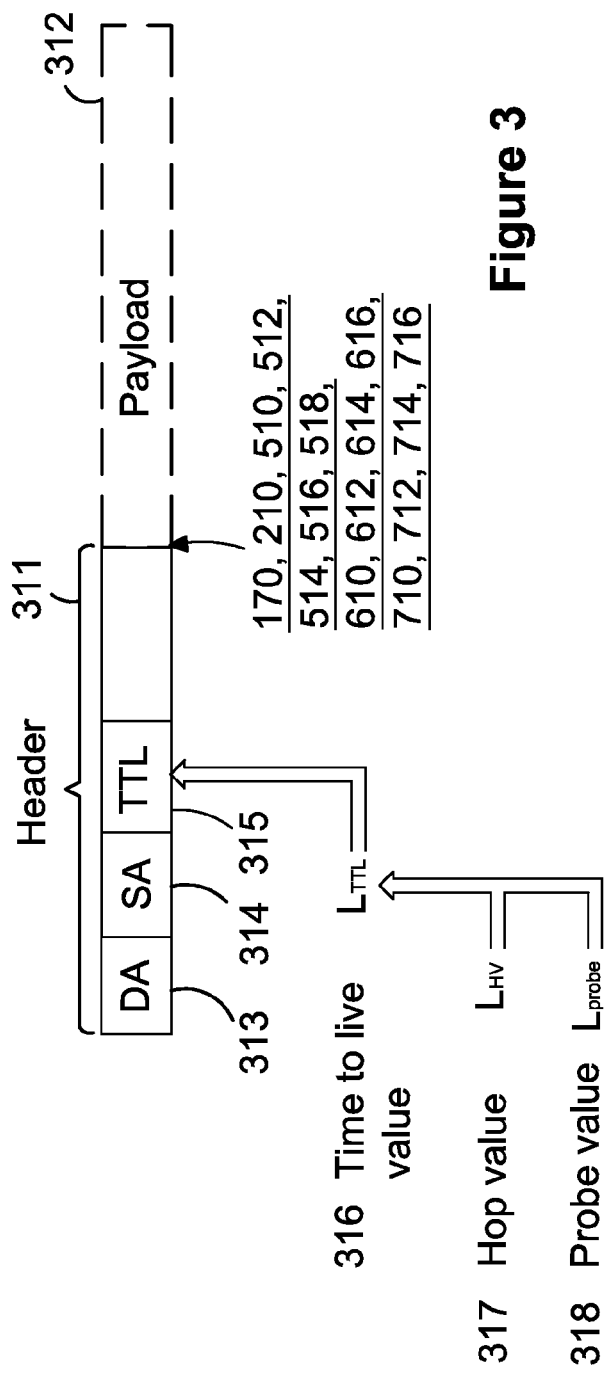
FIG. 3 is a block diagram illustrating the structure of a keep-alive or a probe packet.

FIG. 3 illustrates in a simplified manner the structure of the keep-alive packet 210 which also is the structure of an ordinary IP packet. The packet 210 consists of a header 311 and an optional payload field 312. The header 311 comprises a plurality of information fields as for example the destination address DA 313 and the source address SA 314. The header 311 comprises also an 8-bit information field 315 called TTL time-to-live.

Figure 1B:
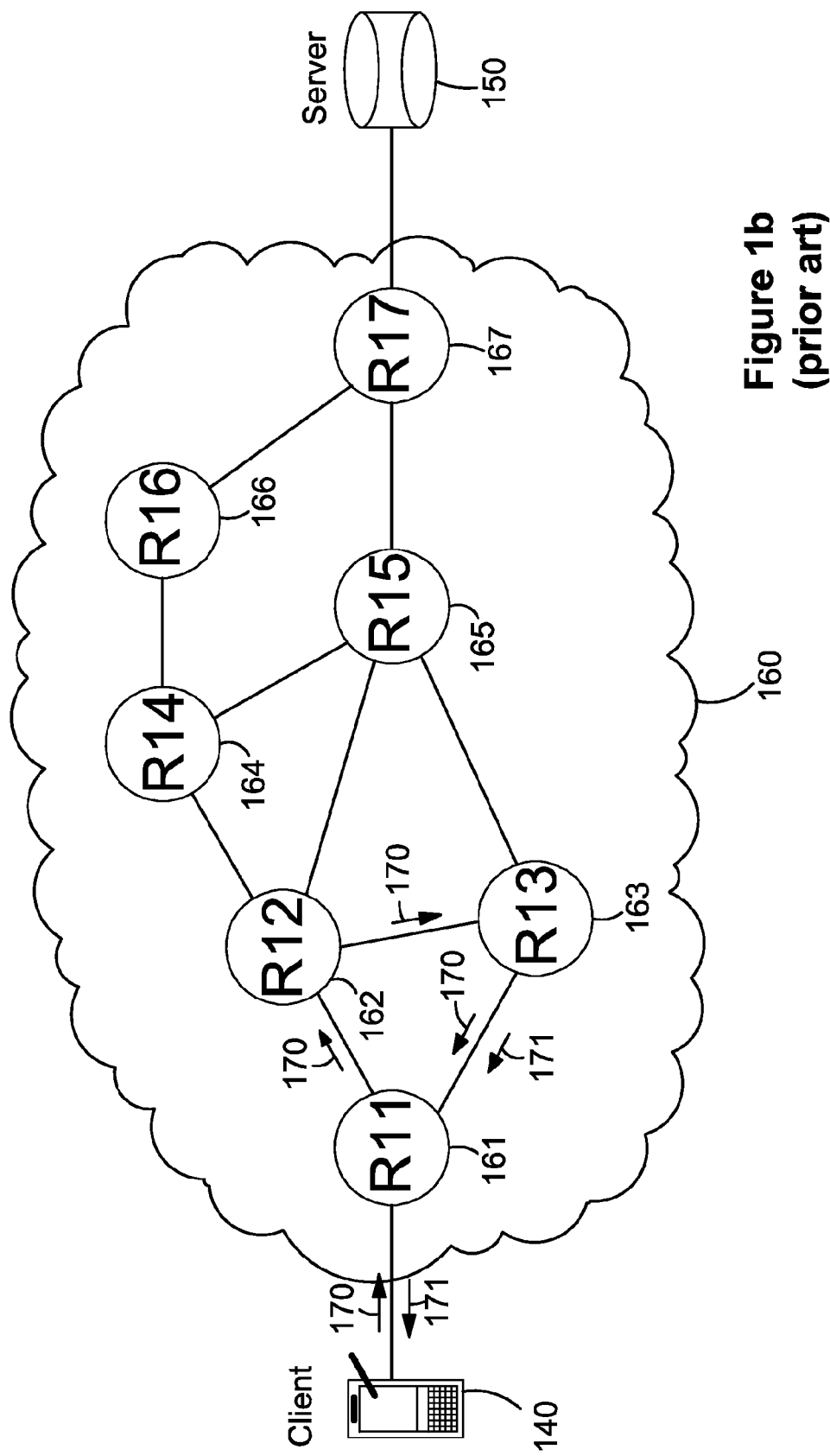
FIG. 1b is a block diagram illustrating the principle of the 'time-to-live' of an IP packet in a multi-hop network.

The primary purpose of the TTL field 315 is illustrated by FIG. 1b. FIG. 1b illustrates a multi-hop network 160 comprising a plurality of routers R11-R17 161-167. The client 140 is trying to send an IP packet 170 (having the structure as illustrated in FIG. 3) towards the server 150. Packet 170 is routed through router R11 161 and R12 162 and towards router R13 163. Due to a misconfiguration in router R13 163, the packet 170 is routed back to router R11 161 instead of to router R15 165. Router R11161 forwards the packet 170 again to router R12 162 and the packet 170 is caught in an end-less loop.

To detect that packet 170 is caught in a loop, the TTL field 315 is used. When the packet 170 is sent from the client 140, an initial TTL value $L_{TTL}$ 316 is put in the TTL field 315. Each time the packet 170 passes routers R11-R13 161-163, the TTL value $L_{TTL}$ 316 is decremented by at least one. When a router, say R13 163 receives the packet 170 and decrements the TTL value $L_{TTL}$ 316 and the value reaches zero, the router R13 163 discards the packet 170 and sends a TTL exceeded packet 171 (in TCP/IP a so called ICMP time exceeded message) back to the client 140. The network 160 is of course a simplification. In reality it may be necessary to make 10-40 hops before a packet 170 has reached its destination. It is therefore recommended that the initial TTL value $L_{TTL}$ 316 is set to at least 64. Some operating systems as Windows NT 4.0 use the value 128.

In the current invention the TTL field 315 serves an additional purpose. In order to send the keep-alive packet 210 from the server 250 far enough to restart the binding timer T1 132 in the NAT 130 but not as far as to the mobile terminal 140, the TTL field 315 is set to a specific TTL value $L_{TTL}$ 316. In FIG. 2 the TTL value $L_{TTL}$ 316 is set to a hop value $L_{HV}$ 317 that is less than the number of hops needed to reach the mobile terminal 140 but greater than or equal to the number of hops needed to reach the router R4 114 (in this case 4 or 5). If (as in FIG. 2) the hop value $L_{HV}$ 317 is set to $L_{HV}=5$, the result is that when router R5 115 receives the keep-alive packet 210, the hop value $L_{HV}$ 317 is decremented to zero and the packet 210 is discarded in action 240. The binding timer T1 132 in the NAT 130 is restarted in action 235, but the mobile terminal 140 is left undisturbed. Following standard IP practice, router R5 115 responds back to the server 250 with a TTL exceeded packet 211.

The method to maintain the TCP connection according to the current invention is also illustrated by a flow chart in FIG. 4b. When the hop value $L_{HV}$ 317 has been set, a timer T2 coupled to the connection 230 is started in step 421 in the server 250. When the timer T2 expires in step 422, the server 250 sends in step 423 a keep-alive packet 210 towards the mobile terminal 140. In each keep-alive packet 210 that leaves the server 250 the TTL field 315 is set to the hop value $L_{HV}$ 317. After the keep-alive packet 210 has been sent in step 423, timer T2 is started again in step 421. The value of timer T2 is set to a value $T_{keep-alive}$ that less than the value $T_{bind}$ of the binding timer T1 132 in the NAT 130. By sending keep-alive packets 210 at regular intervals $T_{keep-alive}$ the binding timer T1 132 is restarted before it expires and the TCP connection through the NAT 130 is maintained.

Figure 5B:
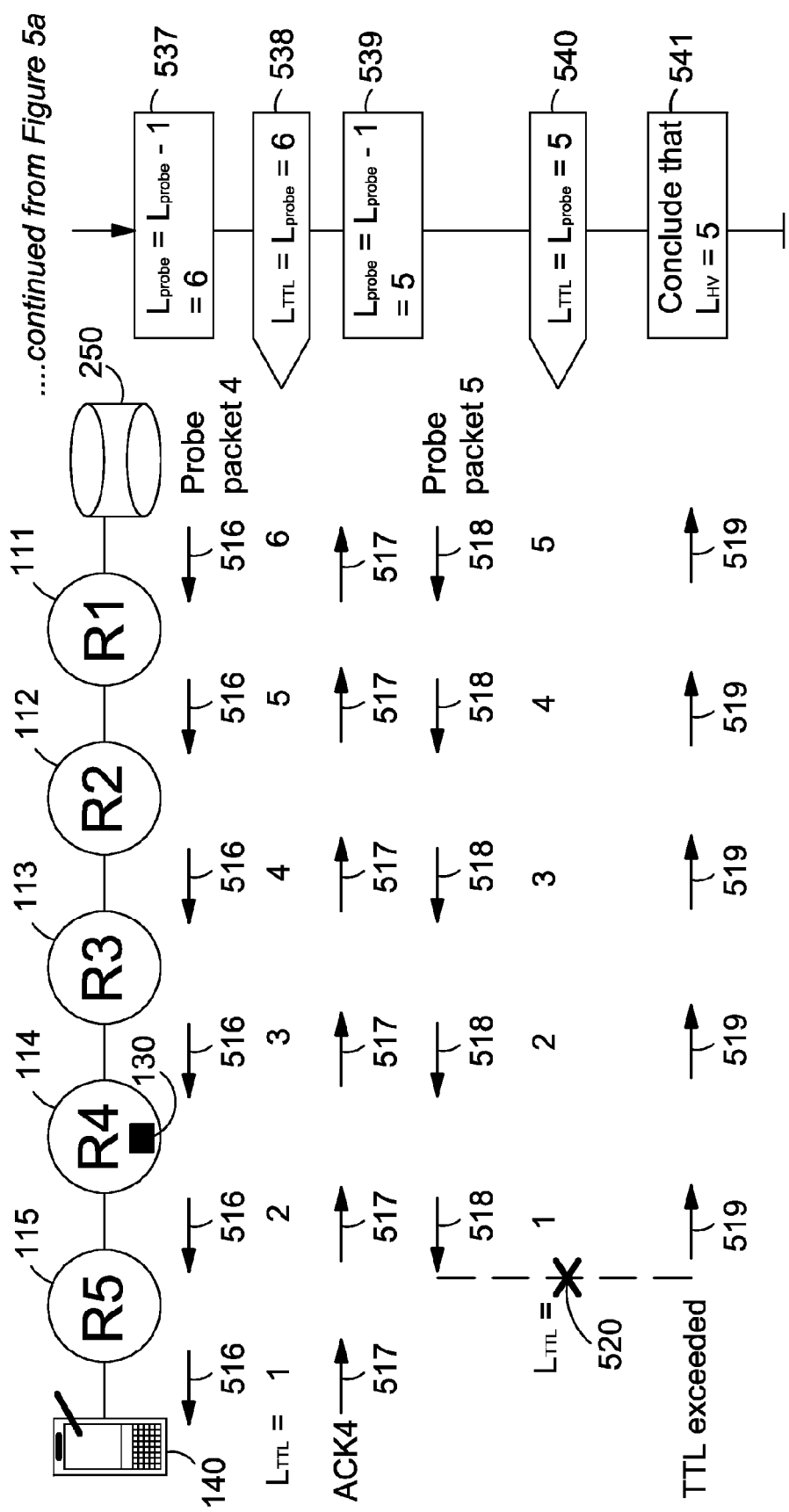

The hop value $L_{HV}$ 317 can be set by configuring the server 250 with a unique hop value $L_{HV}$ 317 for each connection 230. This can be done from the Operation and Maintenance Center OMC 260. The invention comprises however also a number of embodiments of an optional feature to automatically determine the hop value $L_{HV}$ 317. Two detailed embodiments are illustrated in FIGS. 5a, 5b, 6a and 6b. These embodiments are designed to determine a hop value $L_{HV}$ 317 that is one less than the number of router hops the keep-alive packet 210 needs to make in order to reach the mobile terminal 140. In FIGS. 5a, 5b, 6a and 6b the same configuration and the same network elements as in FIG. 2 are used, i.e. the mobile terminal 140 is connected to the server 250 via five routers R1-R5 111-115 where router R4 114 comprises the NAT 130. These embodiments make use of what is here called probe packets 510, 512 etc. The structure of the probe packet 510 etc is the same as for the keep-alive packet 210 (see FIG. 3). The probe packet 510 etc comprises a header 311 and an optional payload 312. The header 311 comprises a destination address field DA 313, a source address field SA 314 and a TTL information field 315. The probe packets 510 etc are sent from the server 250 towards the mobile terminal 140 with different TTL values, so called probe values $L_{probe}$ 318 in the TTL information field 315. FIGS. 5a and 5b also include flow charts with steps 531-541 illustrating how the different values are set and when the hop value $L_{HV}$ 317 has been determined.

In FIG. 5a the server 250 sets in step 531 an initial probe value $L_{probe}=L_{max}$. $L_{max}$ is a value that represents an estimated maximum number of hops necessary make in order to reach the mobile terminal 140. In order to simplify FIGS. 5a and 5b, the maximum number of hops $L_{max}$ is estimated to the value $L_{max}=9$.

In step 532 the server 250 sends a first probe packet 510 towards the mobile terminal 140 with the TTL field 315 set to the TTL value $L_{TTL}=L_{probe}$ (=9). The packet 510 is routed through the routers R1-R5 111-115 and for each router R1-R5 111-115 the packet 510 passes, the TTL value $L_{TTL}$ is decremented by one. As the TTL value $L_{TTL}$ is greater than one when the packet 510 reaches router R5 115, the packet 510 is forwarded to the mobile terminal 140. The mobile terminal 140 responds with a first acknowledge packet ACK1 511 which is routed back to the server 250. The server 250 concludes that the first probe packet 510 has reached the mobile terminal 140 and decrements in step 533 the probe value $L_{probe}$ by one to $L_{probe}-1$ (=8). The server 250 sets in step 534 the TTL value $L_{TTL}$ to the decremented probe value $L_{probe}$ (=8) and sends a second probe packet 512 now with the TTL field 315 set to the new TTL value $L_{TTL}=L_{probe}=8$. As the TTL value $L_{TTL}$ is still greater than one when the packet 512 reaches router R5 115, the packet 512 is forwarded to the mobile terminal 140. Again, the mobile terminal 140 responds with an acknowledge packet, a second packet ACK2 513 which is routed back to the server 250. The server continues to decrement the probe value $L_{probe}$ 318 in steps 535, 537 and 539 and sending further probe packets 514, 516 and 518 in steps 536, 538 and 540. When the fifth probe packet 518 reaches the last router R5 115, the TTL value $L_{TTL}$ is decremented to $L_{TTL}=0$. According to standard IP practice, router R5 115 discards in action 520 the fifth probe packet 518 and responds with a TTL exceeded packet 519. The server 250 can now conclude in step 541 that the hop value $L_{HV}$ 317 must be $L_{HV}=5$ which is one hop less than what is needed to reach the mobile terminal 140.

The algorithm illustrated in FIGS. 5a and 5b is however not optimal. If (in a more realistic case) the maximum number of hops $L_{max}$ is set to 64 and the average number of hops needed is 32, around 32 probe packets 510 in average have to be sent in order to determine that the hop value $L_{HV}$ 317 is 32.

Figure 6A:
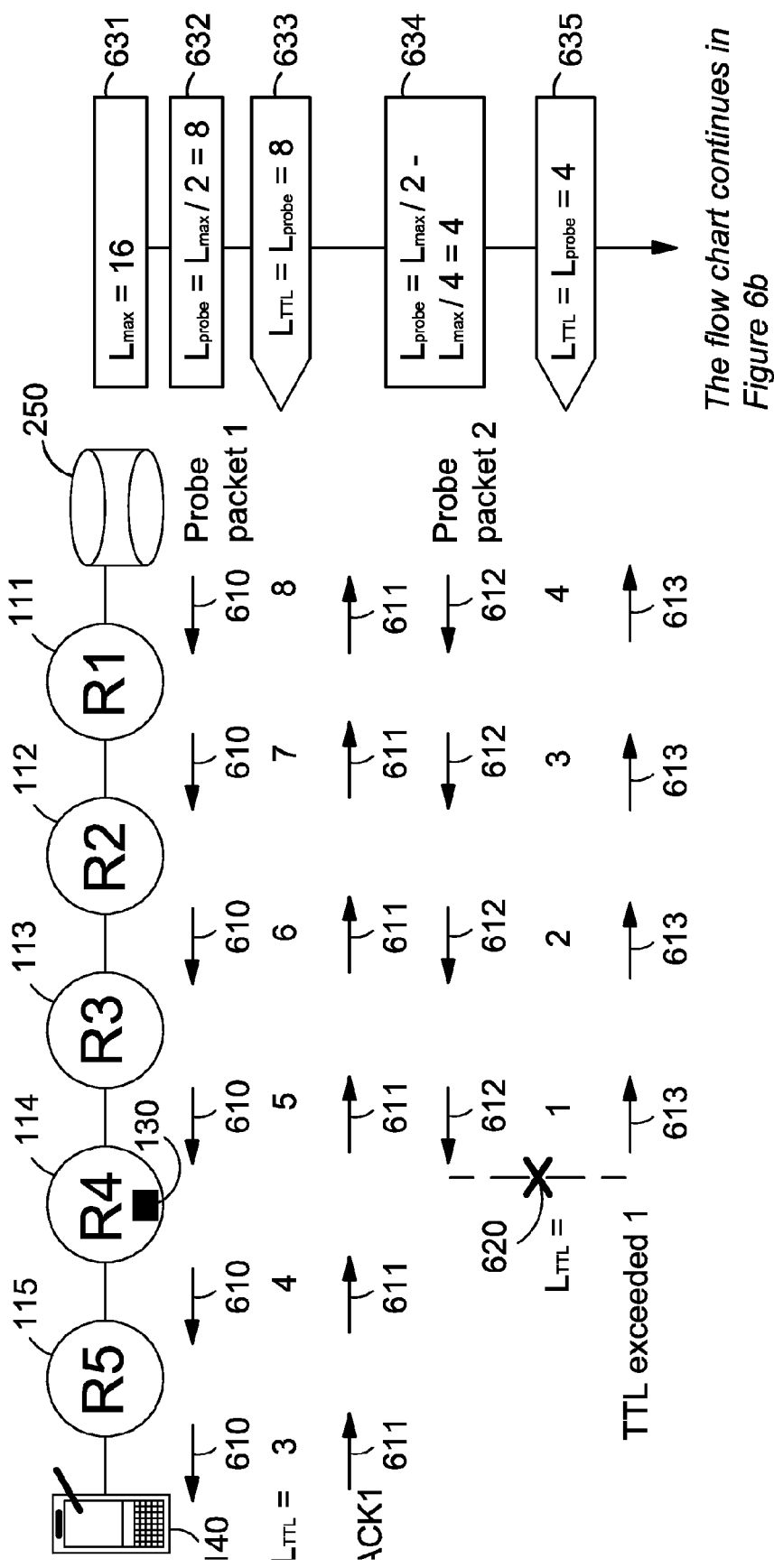
FIGS. 6a and 6b are block diagrams and flow charts illustrating a second embodiment of a method to determine the hop value in a multi-hop network.
Figure 6B:
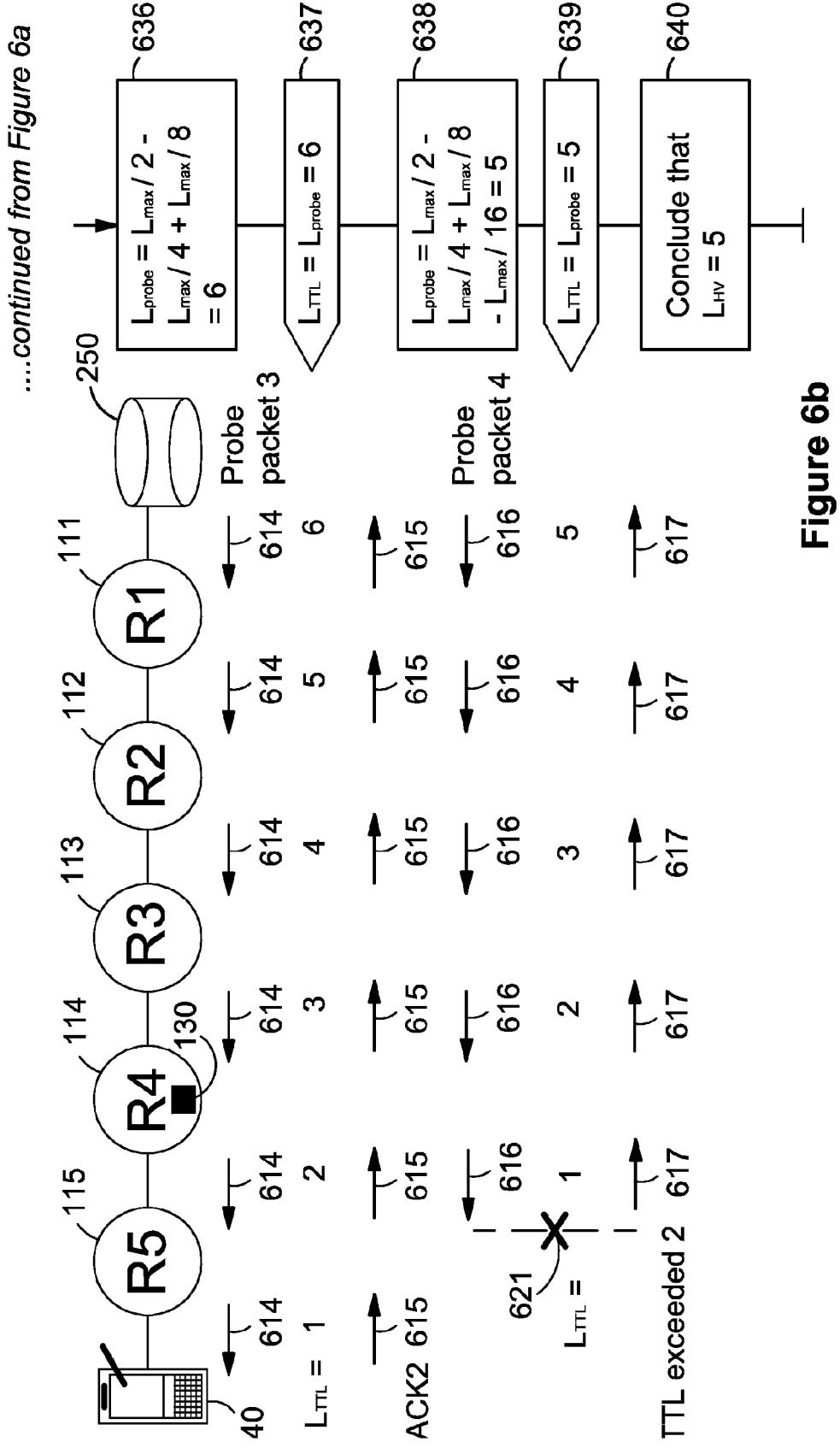

A second more efficient algorithm and a preferred embodiment is a binary search algorithm which is illustrated in FIGS. 6a and 6b. In this algorithm, the number of probe packets that need to be sent is reduced to $\log 2 (L_{max})$. If for example the maximum number of hops $L_{max}$ is set to 64, it is enough to send 6 probe packets and if $L_{max}$ is set to 16, 4 probe packets are sufficient.

In FIGS. 6a and 6b the same configuration as in FIGS. 2, 5a and 5b is used. The maximum number of hops $L_{max}$ is in FIG. 6a set to $L_{max}=16$ in step 631. As a binary search algorithm is used, the probe value is directly set to $L_{probe}=L_{max}/2=8$ in step 632. In step 633 the server 250 sends a first probe packet 610 towards the mobile terminal 140 with the TTL field 315 set to the TTL value $L_{TTL}=L_{probe}=8$. Each time the first probe packet 610 passes one of the routers R1-R5 111-115, the TTL value $L_{TTL}$ is decremented with one. As the TTL value $L_{TTL}$ is still greater than one when the probe packet 610 reaches the router R5 115, the packet 610 is forwarded to the mobile terminal 140. The mobile terminal 140 responds with a first acknowledge packet ACK1 611 back to server 250. As the hop value $L_{HV}$ 317 must be less than the value '8', the server 250 calculates in a next step 634 a new decremented probe value $L_{probe}=L_{max}/2-L_{max}/4=8-4=4$ and sends in step 635 a second probe packet 612 with the TTL field 315 set to this new TTL value $L_{TTL}=L_{probe}/2=4$. As the TTL value $L_{TTL}$ becomes decremented to zero when the second probe packet 612 reaches router R4 114 this router discards in action 620 the probe packet 612 and sends a first TTL exceeded packet 613 back to the server 250. Again, as the hop value $L_{HV}$ 317 is not yet determined, but has to be any of the values $L_{HV}=8, 7, 6, 5, 4$, the server 250 calculates in a next step 636 (please turn to FIG. 6b) a new probe value $L_{probe}=L_{max}/2-L_{max}/4+L_{max}/8=8-4+2=6$. In step 637 a third probe packet 614 with the TTL field 315 set to this new TTL value $L_{TTL}=L_{probe}=6$ is sent from the server 250. In this case the third probe packet 614 reaches all the way to the mobile terminal 140 which returns a second acknowledge packet ACK2 615 to the server 250. As only two possible hop values $L_{HV}$ remains to choose from, $L_{HV}=4$ or $L_{HV}=5$, the server 250 calculates in step 638 a last probe value $L_{probe}=L_{max}/2-L_{max}/4+L_{max}/8-L_{max}/16=5$. The server 250 sends in step 639 a last fourth probe packet 616 with the TTL field 315 set to this new TTL value $L_{TTL}=L_{probe}=5$. This fourth probe packet 616 is discarded in action 621 by router R5 115 which returns a second TTL exceeded packet 617 to the server 250.

As the third probe packet 614 with a probe value $L_{probe}$ set to $L_{probe}=6$ reaches the mobile terminal 140 but not the fourth probe packet 616 with a probe value $L_{probe}$ set to $L_{probe}=5$, it is concluded in step 640 that 5 hops are needed to reach router R5 115 closest to the mobile terminal 140 and that the hop value $L_{HV}$ 317 has to be set to $L_{HV}=5$. To come to this conclusion, four probe packets were needed (=log 2(16)).

The two embodiments described above and illustrated by FIGS. 5a, 5b, 6a and 6b can be generalized into a flow chart as illustrated by the main step 410 in FIG. 4a.

The main step 410 in FIG. 4a comprises a step 411 where the server 250 sets an initial probe value $L_{probe}$. The initial value of $L_{probe}$ depends on the selected algorithm but is related to $L_{max}$ that, again is an estimated maximum number of hops necessary to make in order to reach the mobile terminal 140. In a next step 412, the server 250 sends a probe packet (such as the probe packets 510, 610 etc) towards the mobile terminal 140 with the TTL information field 315 set to an initial TTL value $L_{TTL}=L_{probe}$. Depending on how far in the multi-hop network 110,120 the probe packet reaches, the server 250 can receive two types of response packets, an acknowledge packet ACK as in step 413 or a TTL exceeded packet as in step 415. If the server receives in step 413 an acknowledge packet ACK and the hop value $L_{HV}$ can not yet be determined in step 414, the probe value $L_{probe}$ is decremented in step 417. Depending on the algorithm a decrement value can simply be one as in the algorithm illustrated by FIGS. 5a and 5b or some other value as in the binary algorithm illustrated by the FIGS. 6a and 6b. After that the probe value $L_{probe}$ has been decremented in step 417, the server again sends a new probe packet in step 412. If on the other hand a TTL exceeded packet is received in step 415, and the hop value $L_{HV}$ 317 can not yet be determined in step 416, the probe value $L_{probe}$ is incremented in step 418 and a new probe packet is sent in step 412. Again, the increment value depends on the used algorithm.

When the hop value $L_{HV}$ 317 is determined in step 414 or in step 416, the main step 420 in FIG. 4b to start sending keep-alive packets 210 can be initiated. This main step 420 has already been described further above.

Figure 7A:
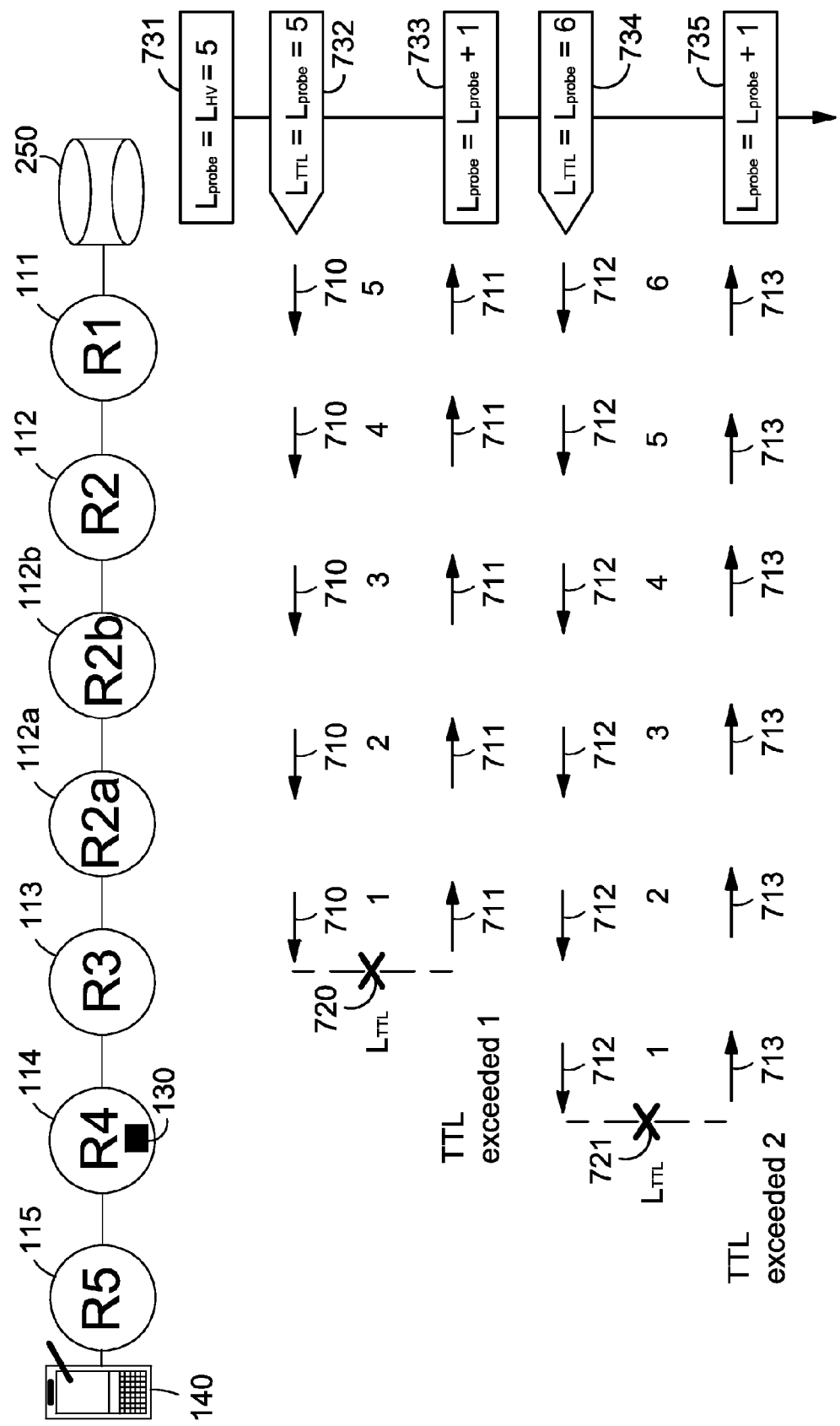
FIGS. 7a and 7b are block diagrams and flow charts illustrating an embodiment of a method to detect if the hop value needs to be changed.
Figure 7B:
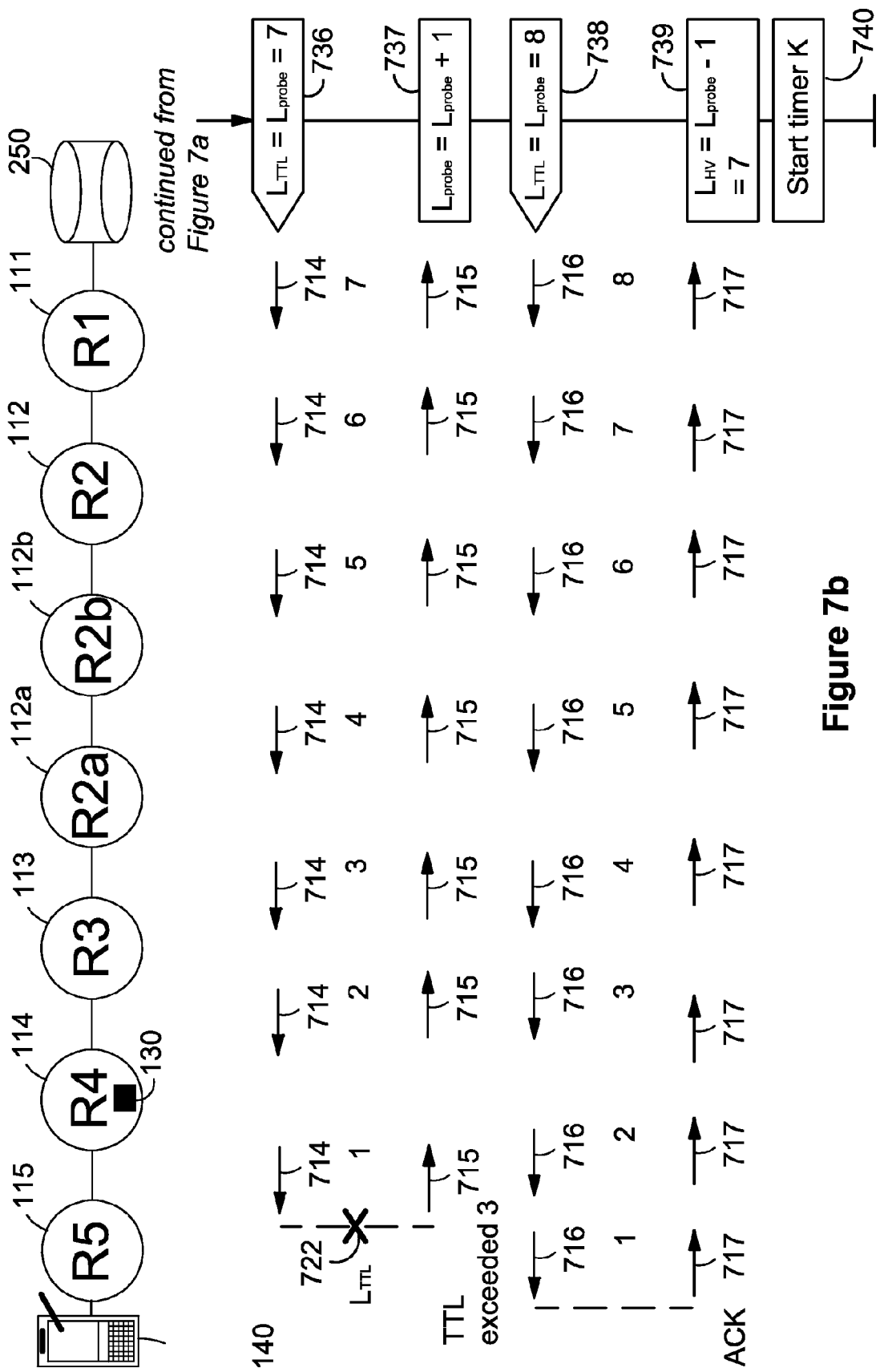
Figure 8:
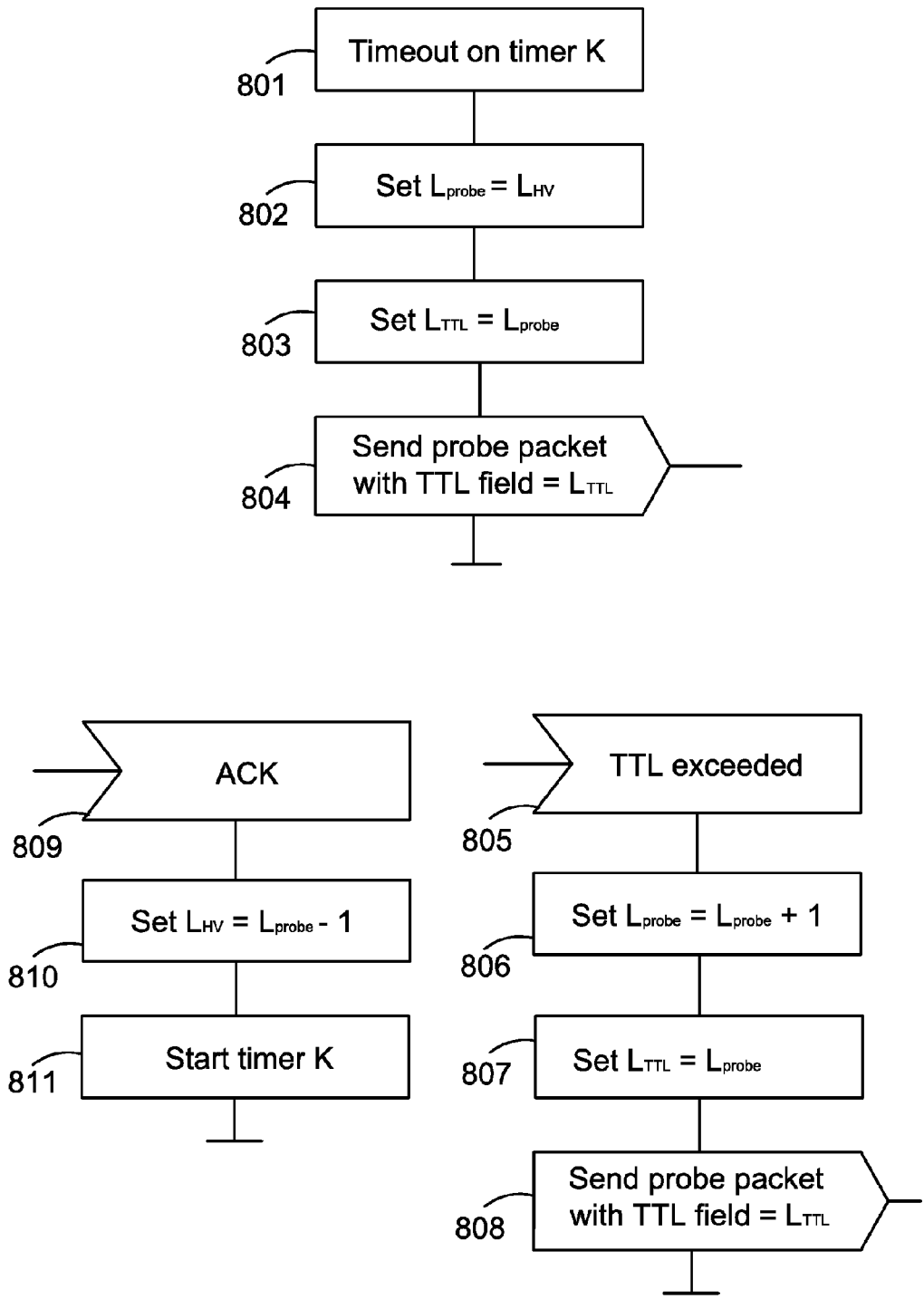
FIG. 8 is a generalized flow chart illustrating a method to detect if the hop value needs to be changed.

Due to the mobility of the mobile terminal 140 and to possible configuration changes in the multi-hop network 110, 120, the number of router hops a data packet needs to make may change over time. This means that the hop value $L_{HV}$ 317 in the keep-alive packet 210 also may need to be modified. The two embodiments of determining the hope value $L_{HV}$ 317 described above can be used to detect these changes if they are initiated at regular time intervals K. Alternatively an algorithm as illustrated in FIGS. 7a, 7b and 8 can be used. The network configuration illustrated in FIGS. 7a and 7b is similar to the configurations in FIGS. 2, 5a, 5b, 6a and 6b, i.e. the mobile terminal 140 is connected to the server 250 via the routers R1-R5 111-115. The difference is that in FIGS. 7a and 7b the link between routers R2 112 and R3 113 has been broken. Inherent from the IP protocol the connection between router R2 112 and R3 113 has been rerouted via two new routers R2a 112a and R2b 112b. In this new configuration, the keep-alive packet 210 having the hop value $L_{HV}$ 317 set to $L_{HV}$=5 can not reach the router R4 114 with the NAT 130 as the packets 210 are discarded already by router R3 113. In order to ensure that the keep-alive packets 210 still reach the router R4 114 with the NAT 130, the hop value $L_{HV}$ 317 needs to be recalculated. In FIG. 7a the hop value $L_{HV}$ 317 has already been determined to $L_{HV}$=5 by any of the algorithms described above. A probe value $L_{probe}$ is set to equal the hop value $L_{probe}$=$L_{HV}$ (=5) in step 731. In step 732 the server 250 sends a first probe packet 710 with the TTL value $L_{TTL}$=$L_{probe}$=5 in the TTL field 315. The TTL value $L_{TTL}$ is decremented by each router the probe packet 710 passes. As the TTL value $L_{TTL}$ is decremented to zero by router R3 113, the probe packet is discarded in action 720 and a first TTL exceeded packet 711 is returned to the server 250. In a next step 733 the server 250 increments the probe value $L_{probe}$=$L_{probe}$+1 and sends in a step 734 a second probe packet 712 with the new TTL value $L_{TTL}$=$L_{probe}$=6. Again, this packet 712 is discarded in action 721 and a second TTL exceeded packet 713 is returned from router R4 114 to the server 250. The server 250 continues in step 735 to increment the probe value $L_{probe}$=$L_{probe}$+1 and sends in a step 736 in FIG. 7b a third probe packet 714 with the new TTL value $L_{TTL}$=$L_{probe}$=7. This packet 714 is also discarded in action 722 and a third TTL exceeded packet 715 is returned to the server 250 from router R5 115. The server 250 continues in step 737 to increment the probe value $L_{probe}$=$L_{probe}$+1 and sends in a step 738 a fourth probe packet 716 with the new TTL value $L_{TTL}$=$L_{probe}$=8. This time the probe packet 716 reaches all the way to the mobile terminal 140 which responds with an acknowledge packet ACK 717. When the acknowledge packet ACK 717 reaches the server 250, the server 250 is able to determine the new hop value $L_{HV}$ 317. The new hop value $L_{HV}$ 317 is in step 739 set to a value $L_{HV}$=$L_{probe}$−1. This is one hop less than the number of hops a keep-alive packet 210 need to make in order to reach the mobile terminal but far enough to reach router R4 114 and to restart the binding timer T1 132 in the NAT 130. After having determined the new hop value $L_{HV}$ 317 the server 250 starts in step 740 a timer K. When this timer K expires, the process to detect changes in the hop value $L_{HV}$ 317 is started all over again with step 731.

The embodiment described above and illustrated by FIGS. 7a and 7b can be generalized into a flow chart as illustrated by FIG. 8. In step 801 the timer K earlier started by the server 250 expires. The server 250 sets in step 802 the probe value $L_{probe}$=$L_{HV}$ and sets in step 803 the TTL value $L_{TTL}$=$L_{probe}$. In a next step 804 the server sends the probe packet 710 towards the mobile terminal 140 with the TTL field 315 set to the TTL value $L_{TTL}$ 316. If an acknowledge packet ACK 717 is received in step 809, this means that the hop value $L_{HV}$ is too large. As a consequence, the server 250 sets a new decremented hop value $L_{HV}$=$L_{probe}$−1 in step 810. No more modifications are made to the hop value $L_{HV}$ 317 at this stage and the timer K is restarted in step 811. If on the other hand a TTL exceeded packet 711 is received in step 805 the server increments in step 806 the probe value $L_{probe}$ 318 to $L_{probe}$=$L_{probe}$+1 and sets the TTL value $L_{TTL}$ 316 to $L_{TTL}$=$L_{probe}$ in step 807. A new probe packet 712 with the TTL field 315 set to the new TTL value $L_{TTL}$ 316 is sent towards the mobile terminal 140 in a next step 808. If a new TTL exceeded packet 713 is received in step 805, the steps 806 to 808 are repeated and all the steps 805 to 808 are repeated until an acknowledge packet ACK 717 is received in step 809. When the ACK packet 717 is received, the hop value $L_{HV}$ 317 is set to the current probe value $L_{probe}$ 318 minus one in step 810 and a time K is again started in step 811. By using the algorithm illustrated in FIG. 8, the server 250 can detect if the hop value $L_{HV}$ 317 needs to be changed and also performs this change.

The probe packets 710, 712, 714, 716 referred to above are preferably sent when the mobile terminal 140 is in an active state as to avoid to 'wake up' the terminal 140 if it has entered sleeping mode. These probe packets 710, 712, 714, 716 could either be packets dedicated for this purpose or ordinary payload carrying packets 101.

If an ordinary payload carrying packet 101 is used as a probe packet 710, the TTL field 315 is set according to the algorithm described above and illustrated by FIG. 8. There is no risk that any payload 312 is lost as the same payload 312 in the probe packet 710 is retransmitted in step 808 until an acknowledge packet ACK 717 is received in step 809.

If it is known beforehand that only one NAT 130 is involved in the connection 230, the algorithm illustrated by FIGS. 7a, 7b and 8 can be further improved. This is accomplished by storing the history of received TTL exceeded packets 711 and acknowledge packets 717. Each of these packets comprises an originating IP address that is used to identify the host 140 or router R5 115 that sent it. By using the history, the probe value $L_{probe}$ 318 in the first probe packet 710 can be set to a more accurate value from the start.

Figure 9:
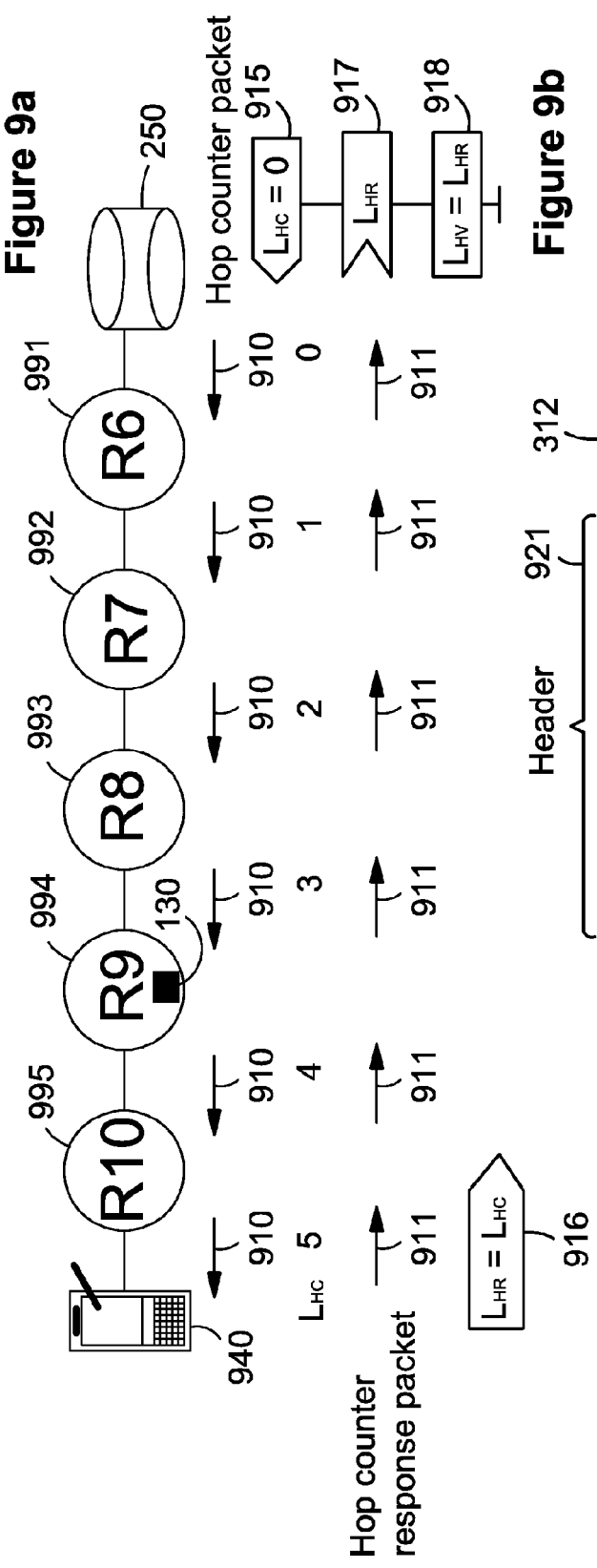
FIG. 9 is a block diagram and a flow chart illustrating a third detailed embodiment of a method to determine the hop value in a multi-hop network.

A third detailed embodiment to determine the hop value $L_{HV}$ 317 is illustrated by FIGS. 9a, 9b and 9c. In this embodiment the network configuration comprises a modified mobile terminal 940 connected to the server 250 via modified routers R6-R10 991-995. Router R9 994 comprises the NAT 130. The server 250 sends at regular intervals a specifically designed probe packet 910 towards the mobile terminal 940. This probe packet 910 is similar to the probe packet 510 but has a modified header 921 comprising an additional hop counter information field HC 923. The other fields Destination Address DA 313, Source Address SA 314, TTL 315 and the optional payload 312 are the same as for the probe packet 510. The hop counter information field HC 923 is adapted so that a hop counter value $L_{HC}$ 925 in the field HC 923 is incremented for each router R6-R10 991-995 the probe packet 910 passes. Server 250 sets the hop counter value $L_{HC}$=0 and sends the probe packet 910 in step 915. For each router R6-R10 991-995 the probe packet passes 910 passes, the hop counter value $L_{HC}$ 925 is incremented by one. When the probe packet 910 reaches the terminal 940, the terminal 940 responds with a response packet 911 in step 916. This response packet 911 has the same information fields 313, 314 etc as the probe packet 910, except that the hop counter information field HC 923 is replaced by a hop counter result information field HR 933. This field HR 933 is carrying a hop counter result value $L_{HR}$ 926 that is set to the incremented hop counter value $L_{HC}$ 925 by the terminal 940. The hop counter result value $L_{HR}$ 926 is transported in the response packet 911 unaffected back to the server 250. When the server 250 receives in step 917 the response packet 911 with the hop counter result value $L_{HR}$ 926, the server 250 sets the hop value $L_{HV}$=$L_{HR}$ in step 918. The new hop value $L_{HV}$ 317 can now be used in subsequent keep-alive messages 210 sent by the server 250 in the main step 420 in FIG. 4. This latter embodiment requires some additions to the IP protocol and it also requires that the design in the routers R6-R10 991-995 and the mobile terminal 940 is adapted.

Yet a forth embodiment to determine the hop value $L_{HV}$ 317 (not illustrated by any figure) is to let the server 250 monitor the value of the TTL field 315 in ordinary payload packets 102 it receives from the mobile terminal 140. A pre-requisite for this embodiment is that the connection 230 is symmetrical (the packets 101,102 pass the same chain of routers in both directions) and that the server 250 knows which operating system the mobile terminal 140 is using. If for example the server 250 knows that the terminal 140 uses Windows NT 4.0 it also knows that the initial value in the TTL field 315 was set to '128'. By subtracting the value in the TTL field 315 in the received payload packet 102 from the initial value '128', the server 250 can determine the hop value $L_{HV}$ 317 from the difference. In this latter embodiment no probe packets 510 are needed.

For those embodiments where probe packets 510 are used, the server 250 has the option to share the load of probe packets 510 between several connections 230 passing the same NAT 130. This is accomplished by storing the history of received TTL exceeded packets 519 and acknowledge packets 511. Each of these packets comprises a source address SA 314 that is used to identify the host 140 or router R4 114 that sent it. By for example identifying those connections 230 that pass the same router R4 114 with the NAT 130, it is possible to send a probe packet 510 on one connection 230 but also on behalf of at least one other connection 230.

The feature of storing the history of received TTL exceeded packets 519 and acknowledge packets 511 can also be used to set the initial probe value $L_{probe}$ (318).

Figure 10:
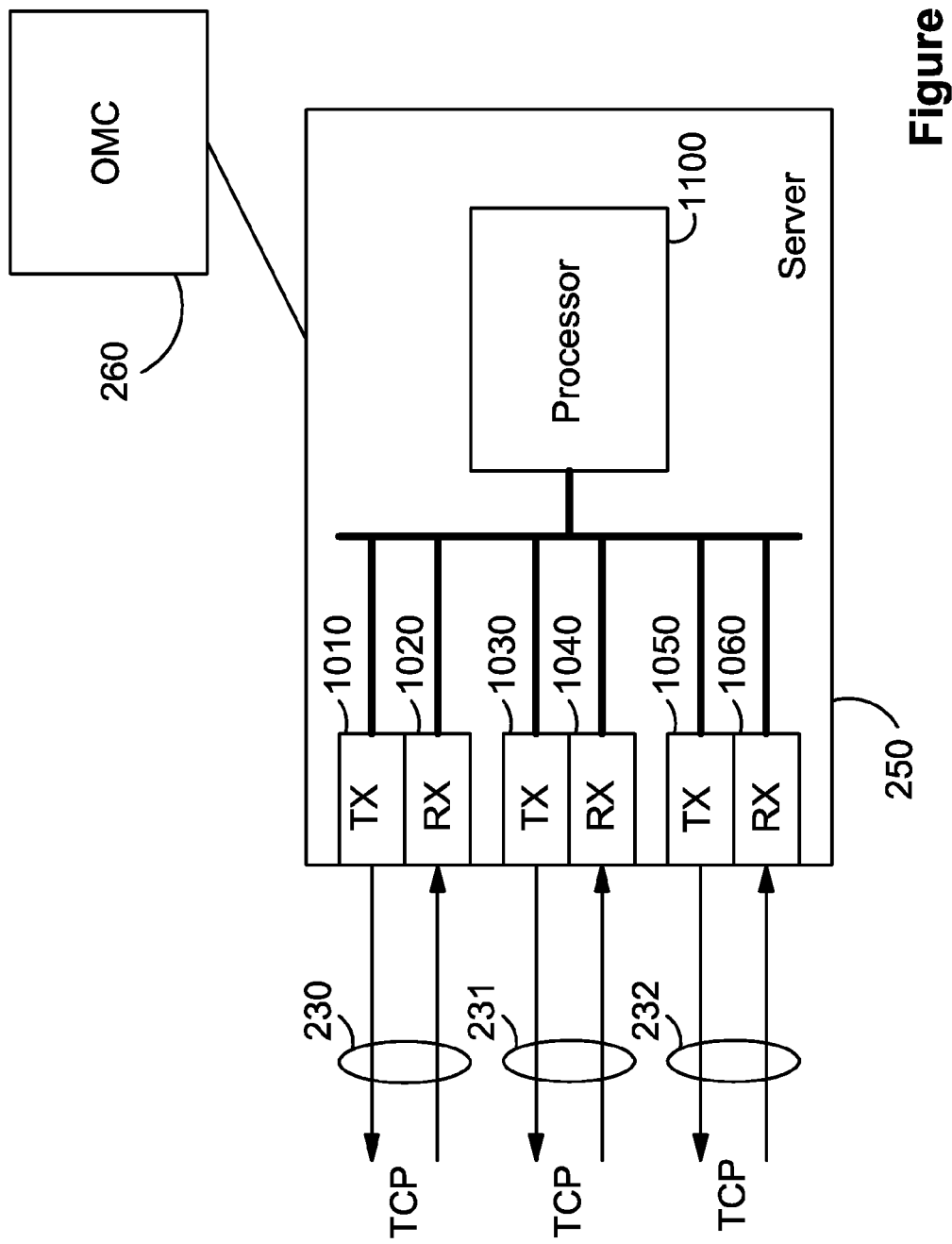
FIG. 10 is a block diagram illustrating a server according to the current invention.

The server (250) that has implemented any of the embodiments above is illustrated by a block diagram in FIG. 10. The server 250 comprises at least one processor device 1100 coupled to at least one transmitter device TX 1010, 1030, 1050 and at least one receiver device RX 1020, 1040, 1060. The transmitter devices 1010, 1030, 1050 and the receiver devices 1020, 1040, 1060 are designed to terminate TCP connections 230, 231, 232 and to transmit and receive protocol data units according to the TCP protocol. The server 250 may also be designed to be connected to an Operation and Maintenance Center OMC 260.

The server 250 has also the optional feature to automatically determine the hop value $L_{HV}$ 317 according to any of the embodiments described above.

In the embodiments described above the invention is applied to connection binding timers T1 in a single NAT 130. The invention can also be applied to a connection that passes a plurality of NATs 130 or other types of network nodes (114) that also have connection binding timers implemented.

The second host 140 is in the embodiments described as being a mobile terminal. The current invention is suitable for any second host 140 (mobile or fixed) where keep-alive packets 210 cause disturbance to the operation of the second host 140.

Furthermore the first host 250 is described in the embodiments as being a server. The first host 250 can for example also be a specifically adapted terminal where the connection 230 is a peer-to-peer P2P connection. I.e. the connection 230 can be established by any of the first or the second host 140, 230.

The invention claimed is:

1. A method of maintaining a connection established in a multi-hop network between a first host and a second host and passing through at least one network node that is designed to release the connection after a certain time of inactivity the method comprising the steps of:
    sending from the first host towards the second host at least one probe packet having a time-to-live information field set to a probe value $L_{probe}$;
    receiving either a corresponding acknowledge packet ACK or a corresponding time-to-live exceeded packet;
    decrementing the probe value $L_{probe}$ if an acknowledge packet ACK is received or incrementing the probe value $L_{probe}$ if a time-to-live exceeded packet is received;
    repeating the steps using a binary search algorithm until a hop value $L_{HV}$ has been determined that is less than the number of hops the probe packet needs to make in order to reach the second host but greater than or equal to the number of hops the probe packet needs to make in order to reach the network node;
    wherein a number of probe packets that need to be sent in order to determine the hop value $L_{HV}$ is equal to log 2($L_{max}$), wherein $L_{max}$ is equal to a maximum number of hops; and
    sending a keep-alive packet from the first host towards the second host where the keep-alive packet is designed to delay the release of the connection and having a time-to-live information field set to the hop value $L_{HV}$.

2. The method as in claim 1, wherein the step of sending the keep-alive packet is repeated at regular time intervals.

3. The method as in claim 1, wherein the set of steps of determining the hop value $L_{HV}$ is repeated at regular time intervals.

4. The method as in claim 1, wherein the probe packet is a payload carrying packet.

5. The method as in claim 1, wherein the connection is a TCP connection, the network node is a Network Address Translation function (NAT), the first host is a server and the second host is a mobile terminal.

6. The method as in claim 1, wherein the hop value $L_{HV}$ is unique for each connection.

7. The method as in claim 1, wherein the keep-alive packet is configured to start a timer.

8. The method as in claim 1, wherein the first host is a server including a processor.

9. A host adapted to maintain a connection established in a multi-hop network with another host passing through a network node that is designed to release the connection after a certain time of inactivity, comprising:
    a processor, configured to:
        provide a probe packet having a time-to-live information field set a probe value $L_{probe}$;
        receive either an acknowledge packet ACK or a time-to-live exceeded packet;
        decrement the probe value $L_{probe}$ if the acknowledge packet ACK is received or increment the probe value $L_{probe}$ if the time-to-live exceeded packet is received;
        perform a binary search algorithm to determine a hop value $L_{HV}$ that is less than a number of hops the probe packet needs to make to reach the another host but greater than or equal to the number of hops the probe packet needs to make to reach the network node;
        wherein a number of probe packets that need to be sent in order to determine the hop value $L_{HV}$ is equal to log 2($L_{max}$), wherein $L_{max}$ is equal to a maximum number of hops; and
        provide a keep-alive packet for the another host designed to delay a release of the connection and having a time-to-live information field set to the hop value $L_{HV}$.

10. The host as in claim 9, wherein said processor is configured to provide the keep-alive packet at a regular interval.

11. The host as in claim 9, wherein the processor is configured to determine the hop value $L_{HV}$ at a regular time interval.

12. The host as in claim 9, wherein the probe packet is a payload carrying packet.

13. The host as in claim 9, wherein the connection is a TCP connection and the network node is a Network Address Translation (NAT) function.

14. The hoot as in claim 9, wherein the host is a server.

15. The host as in claim 9, wherein the another host is a mobile terminal.

16. The host as in claim 9, further comprising a transmitter device configured to send the probe packet toward the another host and send the keep-alive packet toward the another host.

17. The host as in claim 9, further comprising a receiver device configured to receive either the acknowledge packet ACK or the time-to-live exceeded packet.

18. The host as in claim 9, wherein the hop value $L_{HV}$ is unique for each connection.

19. The host as in claim 9, wherein the keep-alive packet is configured to start a timer.

20. The host as in claim 9, wherein the processor is configured to employ a history of acknowledge packets ACK or time-to-live exceeded packets to set the probe value $L_{probe}$.

* * * * *

UNITED STATES PATENT AND TRADEMARK OFFICE
CERTIFICATE OF CORRECTION

| | | |
|---|---|---|
| PATENT NO. | : 8,751,669 B2 | Page 1 of 1 |
| APPLICATION NO. | : 12/808555 | |
| DATED | : June 10, 2014 | |
| INVENTOR(S) | : Eriksson | |

It is certified that error appears in the above-identified patent and that said Letters Patent is hereby corrected as shown below:

On the Title Page, in Item (56), under "OTHER PUBLICATIONS", in Column 2, Line 1, delete "keep-alive hello"." and insert -- keep-alive hellos". --, therefor.

In the Drawings:

In Fig. 6a, Sheet 8 of 14, delete Tag "I40" and insert Tag -- 140 --, therefor.

In Fig. 6b, Sheet 9 of 14, delete Tag "40" and insert Tag -- 140 --, therefor.

In the Specification:

In Column 5, Line 53, delete "R11161 forwards" and insert -- R11 161 forwards --, therefor.

In the Claims:

In Column 12, Line 42, in Claim 9, delete "set a probe" and insert -- set to a probe --, therefor.

In Column 13, Line 4, in Claim 14, delete "The hoot" and insert -- The host --, therefor.

Signed and Sealed this
Twenty-third Day of September, 2014

Michelle K. Lee
*Deputy Director of the United States Patent and Trademark Office*